US009985501B2

(12) United States Patent
Ribarov et al.

(10) Patent No.: US 9,985,501 B2
(45) Date of Patent: May 29, 2018

(54) GENERATORS WITH OPEN LOOP ACTIVE COOLING

(71) Applicant: Hamilton Sundstrand Corporation, Charlotte, NC (US)

(72) Inventors: Lubomir A. Ribarov, West Hartford, CT (US); Robert S. Downing, Rockford, IL (US); Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 916 days.

(21) Appl. No.: 14/172,074

(22) Filed: Feb. 4, 2014

(65) Prior Publication Data
US 2015/0048699 A1 Feb. 19, 2015

Related U.S. Application Data

(60) Provisional application No. 61/866,780, filed on Aug. 16, 2013.

(51) Int. Cl.
*H02K 9/20* (2006.01)
*H02K 9/00* (2006.01)
*H02K 9/197* (2006.01)
*H02K 1/32* (2006.01)
*H02K 9/19* (2006.01)

(52) U.S. Cl.
CPC .............. *H02K 9/197* (2013.01); *H02K 1/32* (2013.01); *H02K 9/19* (2013.01)

(58) Field of Classification Search
CPC .................... H02K 9/00; H02K 1/32

USPC .......... 310/52, 54, 58, 59, 60 A, 61
See application file for complete search history.

(56) References Cited

U.S. PATENT DOCUMENTS 2,887,593 A * 5/1959 Wiedemann .......... H02K 9/10
                                                    310/58
4,227,102 A * 10/1980 Rozenfeld ............ H02K 9/20
                                                    310/52
4,426,592 A * 1/1984 Berzin .................. H02K 9/197
                                                    310/52

(Continued)

FOREIGN PATENT DOCUMENTS

EP          1821392        8/2007
EP          2053727        4/2009

OTHER PUBLICATIONS

Kostenko, M. Piotrovsky, L., Electrical machines, vol. 2: Alternating current Machines, Mir Publishers, Moscow, 1974.

(Continued)

*Primary Examiner* — Jose Gonzalez Quinones
(74) *Attorney, Agent, or Firm* — Locke Lord LLP; Scott D. Wofsy; Christopher J. Cillié

(57) ABSTRACT

A rotor body for a high-speed generator includes a rotor body with interior and exterior surfaces, a coolant inlet and outlet, and a rotor cooling path for actively cooling the rotor body. The coolant inlet and outlet extend between the interior and exterior surfaces. An interior segment of the rotor cooling path fluidly couples the coolant inlet and coolant outlet and is bounded by the rotor body interior surface. An exterior segment of the cooling path is bounded by the rotor body exterior surface and fluidly couples the coolant outlet an environment external to the rotor body.

19 Claims, 4 Drawing Sheets

(56) References Cited

U.S. PATENT DOCUMENTS

| | | | |
|---|---|---|---|
| 2007/0075596 A1* | 4/2007 | Hall .................. | H02K 1/32 310/61 |
| 2007/0194638 A1* | 8/2007 | Birdi .................. | H02K 9/19 310/54 |
| 2009/0121563 A1* | 5/2009 | Zhou .................. | H02K 9/19 310/54 |
| 2010/0320850 A1* | 12/2010 | Lemmers, Jr. ........ | H02K 9/19 310/54 |
| 2014/0000755 A1 | 1/2014 | Richardson et al. | |

OTHER PUBLICATIONS

Feller, M., "Two Phase Windage and Heat Transfer in a Rotating Gap," M.S. Thesis, Northern Illinois University, Jul. 7, 2010.
Preliminary Search Report from Republique Francaise Institut National De La Propriete Industrielle (INPI) dated May 18, 2017 for Application No. FR 1457775.

* cited by examiner

GENERATORS WITH OPEN LOOP ACTIVE COOLING

CROSS-REFERENCE TO RELATED APPLICATIONS

This application claims the benefit of priority to U.S. Provisional Patent Application No. 61/866,780 filed Aug. 16, 2013 which is incorporated by reference herein in its entirety.

BACKGROUND OF THE INVENTION

1. Field of the Invention

The present disclosure relates to systems for generating electrical power, and more particularly to high-speed generators having open loop actively cooled rotors.

2. Description of Related Art

Conventional space vehicles use on-board generators to provide power for various on-board devices. Developments towards the "more-electric" space vehicle have led to increased power demands to support on-board electrical equipment employed in such space vehicle architectures. High-speed generators, e.g. generators having rotational components with speeds approaching or exceeding 250,000 rotations per minute, are of interest in meeting these needs due to their relative compactness, efficiency, and high energy density.

One challenge with high-speed generators is that windage effects in the gap between the rotor and stator makes removing heat generated from magnetic eddy losses and resistive heating difficult. This is because, at high rotational speeds, the frictional viscous drag of the fluid against the rotor surface heats the fluid sufficiently to make heat transfer less readily across the gap from the rotor to the stator. It also can make maintaining the gap clearance difficult. Conventional terrestrial generators, such as utility generators, employ closed loop rotor and stator cooling systems for removing heat, often using relatively massive and complex cryogenic systems.

Conventional systems and methods for space vehicle power generation have generally been considered satisfactory for their intended purpose. However, there is a need for improved generators that are efficient and have high power density. There also remains a need for generators that are easy to make and use. The present disclosure provides solutions for these needs.

SUMMARY OF THE INVENTION

A rotor for a high-speed generator includes a rotor body with an interior surface and an opposed exterior surface, a coolant inlet and outlet, and a rotor cooling path. An interior cooling path segment of the cooling path fluidly couples the coolant inlet with the outlet and is bounded by the rotor body interior surface. An exterior cooling path segment of the cooling path is bounded by the rotor body exterior surface. The exterior cooling path segment fluidly couples the coolant outlet to the environment external to the rotor for actively cooling the rotor body.

In certain embodiments, the rotor body defines coolant outlets disposed along an axial length of the rotor body. The outlet can be bounded by a sidewall extending between the interior and exterior surfaces of the rotor body through a thickness of the rotor body. The sidewall can intersect a longitudinal axis of the rotor body obliquely such that the coolant outlet is oriented toward a first end portion of the rotor body. The coolant outlet can be oriented toward a second end portion of the rotor body. The sidewall can define a coolant outlet axis oriented radially outward and towards a direction of rotation of the rotor body. The coolant outlet axis can be oriented radially outward and in a direction opposing rotation of the rotor body.

In accordance with certain embodiments, the rotor body has a baffle coupled to the rotor body inner surface that divides an interior cavity into a plurality of coolant channels extending between the coolant inlet and the coolant outlet. The coolant inlet can be configured to cool bearings supporting the rotor body using coolant traversing the coolant inlet. The rotor body can include a first and second coolant inlet arranged on opposite ends of the rotor body.

It is contemplated that the coolant inlet is configured to fluidly couple the rotor body to a cryogenic fuel supply. The coolant inlet can be configured to fluidly couple the rotor body to a hydrogen, oxygen, xenon, or helium supply. The coolant outlet can be fluidly coupled to an external environment for open loop cooling of the rotor body.

A turbo-alternator includes a rotor as described above, a stator, and a cooling path. The stator has an inner surface opposing the rotor body exterior surface and bounding the exterior cooling path segment of the rotor cooling path. The cooling path fluidly couples to the rotor cooling path and includes a supply orifice and an exhaust orifice. The supply orifice is configured to fluidly couple with a pressurized coolant source for actively cooling the rotor body.

In certain embodiments, the cooling path includes a speed control valve fluidly coupled between the supply orifice and the coolant inlet of the rotor body. The speed control valve can fluidly couple to the rotor body through a first coolant inlet and a second coolant inlet. The first and second coolant inlets are arranged on opposite ends of the rotor body.

A generator includes an inner body and an outer body. The inner body defines a longitudinal axis, an interior surface and an opposed exterior surface, and a coolant inlet and outlet extending between the interior and exterior surfaces of the inner body. The outer body is arranged outboard of the inner body. A cooling path defined by the inner and outer bodies includes an interior cooling path bounded by the inner body interior surface and fluidly coupling the coolant inlet to the coolant outlet, and an exterior exhaust path bounded by the inner body exterior surface and outer body interior surface for fluidly coupling the coolant outlet to the external environment of the generator. The outer body is configured for rotation about the longitudinal axis of the inner body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 3:
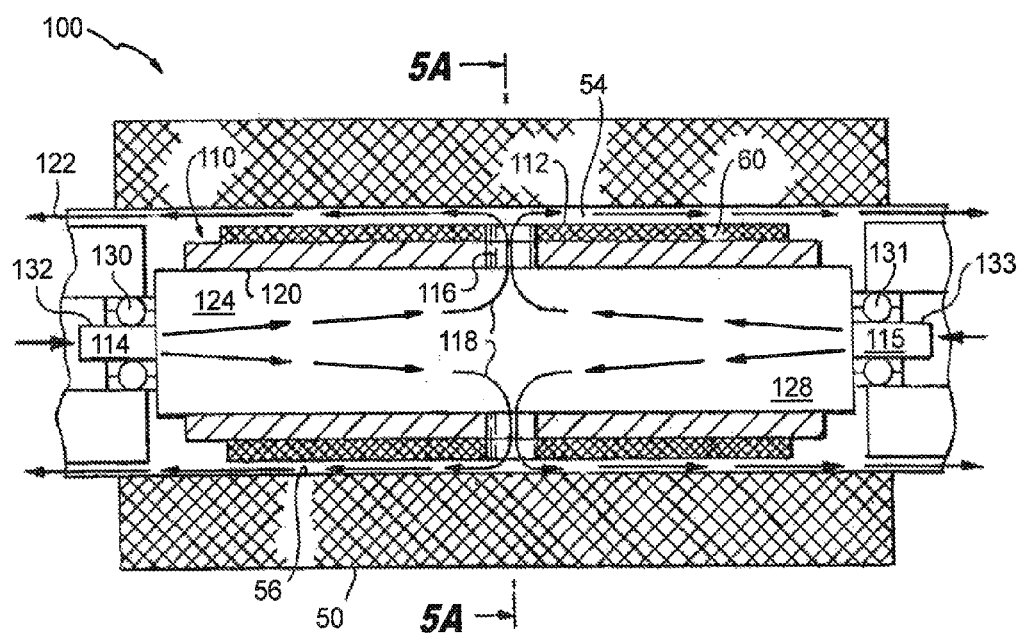
FIG. 3 is a schematic cross-sectional view of a generator of the turbo-alternator of FIG. 1, showing the rotor body.

Reference will now be made to the drawings wherein like reference numerals identify similar structural features or aspects of the subject disclosure. For purposes of explanation and illustration, and not limitation, a view of an exemplary embodiment of a rotor in accordance with the disclosure is shown in FIG. 3 and is designated generally by reference character 100. Other embodiments of the rotor in accordance with the disclosure, or aspects thereof will be described. The systems and method described herein can be used in high-speed generators, such as in turbo-alternators for spacecraft.

Figure 1:
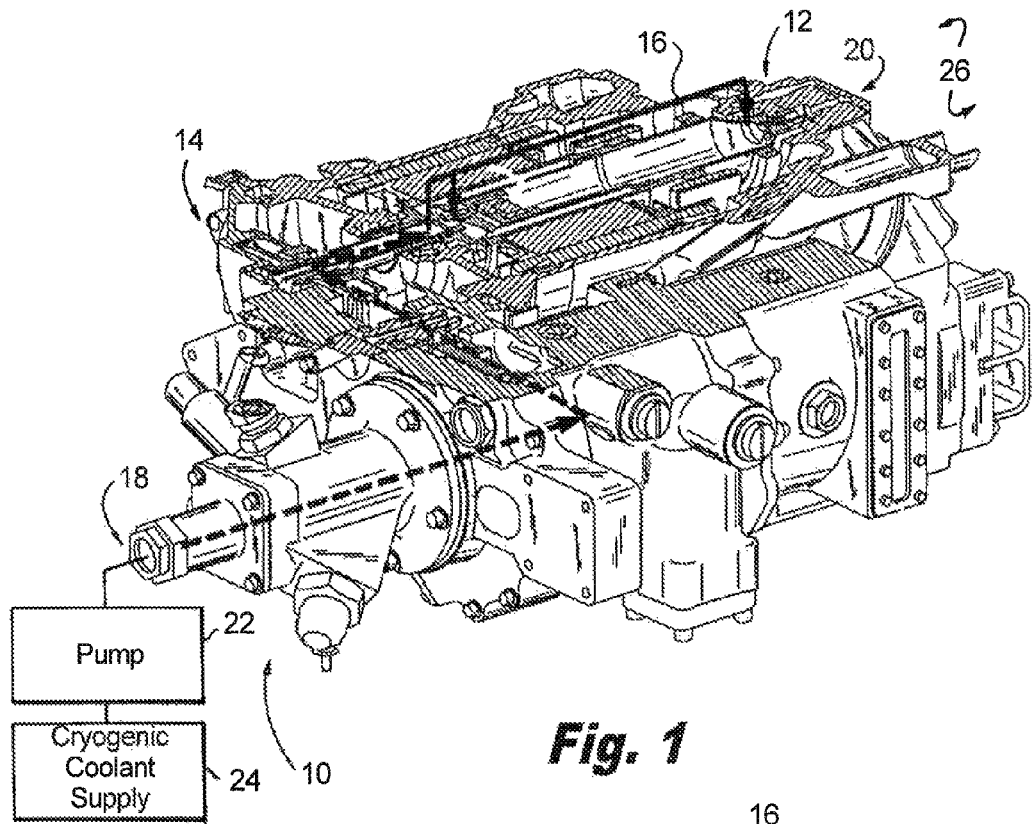
FIG. 1 is a cross-sectional perspective view of a turbo-alternator generator.

Referring to FIG. 1, a turbo-alternator 10 is shown. Turbo-alternator 10 includes a generator 12, a turbine 14, and a coolant conduit 16. Turbine 14 is mechanically coupled to generator 12 via an output shaft. The output shaft mechanically couples turbine 14 through an intermediate gear and an output gear, the output gear in turn rotating a shaft of generator 12 to generate electrical power. As will be appreciated by those skilled in the art, other coupling arrangements can be included within the scope of the present disclosure.

Coolant conduit 16 extends between a supply orifice 18 and an exhaust orifice 20. Coolant conduit 16 fluidly couples turbine 14 and generator 12 between supply orifice 18 and exhaust orifice 20, thereby placing each in fluid communication with the others. As will be appreciated, coolant conduit 16 also includes suitably arranged and sized coolant conduit segments for interconnecting turbo-alternator elements between supply orifice 18 and exhaust orifices 20.

Supply orifice 18 fluidly couples turbo-alternator 10 to a coolant supply 24 and is configured and adapted to receive a cryogenic fluid. The coolant includes a cryogen such as hydrogen, and more particularly liquid hydrogen fuel from e.g., a space vehicle. The coolant can include gaseous, liquid, or a mixture of phases. Active cooling of generator is accomplished by forcing coolant into generator 12 using a pump 22 fluidly coupled between the coolant supply 24 and supply orifice 18. Active cooling of generator 12 may also be accomplished by fluid pressure within coolant supply 24 in a "blow down" type system wherein the head of hydrogen in the supply tank accelerates the coolant to provide pressure at supply orifice 18.

Typical space launch vehicles are propelled by combining hydrogen with an oxidizer in an exothermal chemical reaction to create high-temperature, high-pressure exhaust propellant gas. Hydrogen can also serve as coolant for high-speed generators because of its low density, low viscosity, high specific heat, and high thermal conductivity. Hydrogen is typically not used in space vehicles for generator coolant because (a) its value as fuel makes it too important to use for open loop generator cooling, and (b) the cryogenic subsystem necessary to scavenge and return hydrogen coolant to the fuel system is prohibitively massive for conventional space launch vehicles. However, embodiments of the rotor body described below allow for construction of high-speed generators that require extremely limited amounts of coolant, making the advantages of open loop (e.g. a system where coolant is exhausted to the environment 26 external to the vehicle without return to the vehicle fuel system or reuse) generator cooling with hydrogen fuel outweigh the disadvantages of consuming fuel for generator cooling. In embodiments, hydrogen consumed for open loop generator cooling during the vehicle lifespan is sufficiently small to warrant incorporating on a space vehicle, and may be on the order of about 0.05% and 0.1% of the vehicle fuel supply.

Figure 2:
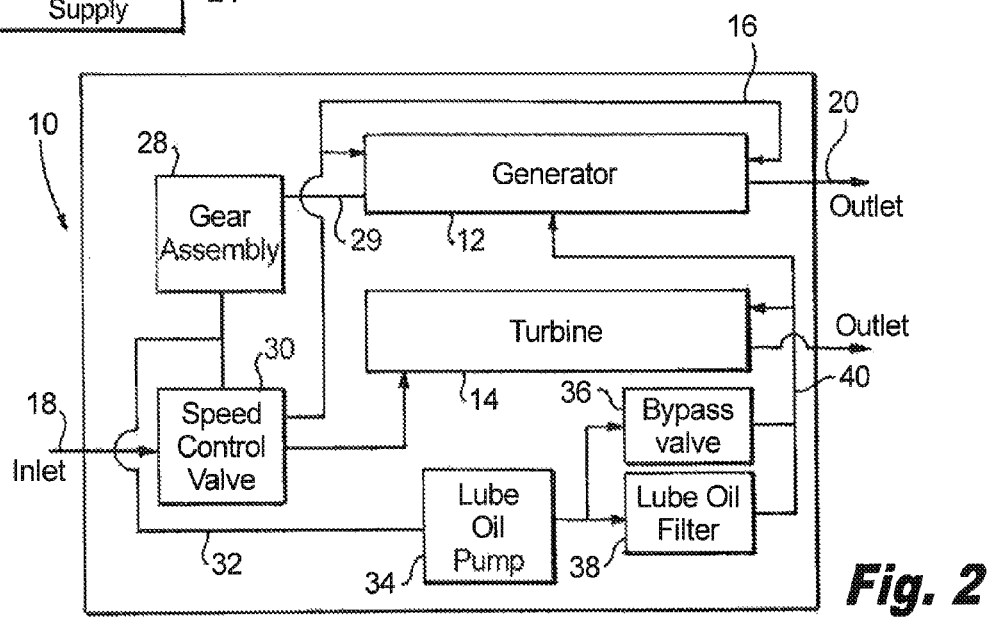
FIG. 2 is a schematic view of the turbo-alternator of FIG. 1, showing the coolant flow path of the turbo-alternator generator of FIG. 1.

Referring now to FIG. 2, turbo-alternator 10 is shown schematically. Turbo-alternator 10 includes a gear assembly 28 that mechanically couples turbine 14 to generator 12. The coupling can be a shaft configured to rotate a rotor of generator 12 using work extracted from the coolant. A speed control valve 30 fluidly communicates with supply orifice 18 and generator 12 through coolant conduit 16 and is also operative to control the speed of turbine 14 and/or generator 12, such as by throttling the coolant flow provided to turbo-alternator 10. As will be appreciated by those skilled in the art, the rotatable body can be an inner body arranged within a fixed outer body. Alternatively, the rotatable body can be a rotatable outer body arranged about a fixed inner body, e.g. an inside out generator.

Turbo-alternator 10 also includes a lube oil circuit with a lube oil pump 34, a lube oil bypass valve 36, and a lube oil filter 38 interconnected by lube oil conduits 32 and 40. Lube oil conduits 32 and 40 are disposed within the housing of turbo-alternator 10, and interconnect oil pump 34, speed control valve 30, and gear assembly 28 with turbine 14 and generator 12. Lube oil filter 38 is serially disposed between lube oil pump 34 and turbine 14, and operable to filter lube oil flowing between lube oil conduits 32 and 40. Lube oil bypass valve 36 is coupled in parallel with lube oil filter 38 between oil pump 34 and turbine 14, and is operable to bypass lube oil filter 38 in the event of blockage or other malfunction. In embodiments, turbine 14 is operable to function as an oil cooler by thermally transferring heat from lube oil circulated through turbine 14 into coolant flowing through turbine 14, thereby extending the lifespan of lube oil circulating in the system. As will be appreciated, respective elements of the lube oil system are interconnected by lube oil circuit conduit segments suitably sized and arranged to route oil as suitable for the application.

Referring now to FIG. 3, a rotor 100 for generator 12 is shown. Rotor 100 includes a stator 50 circumferentially surrounding a rotor body 110. Stator 50 includes an interior surface 56 opposing rotor body 110. Rotor body 110 includes an exterior surface 112 with rotor windings 60, a first coolant inlet 114, and a coolant outlet 116. An interior rotor cooling path segment, indicated with arrows 118, is defined by an interior surface 120, extends coolant inlet 114 with coolant outlet 116, and fluidly couples coolant inlet 114 with coolant outlet 116. Exterior surface 112 of rotor body 110 and interior surface of stator 50 cooperatively define an axially extending circumferential gap 54. Gap 54 forms an exterior cooling path segment, indicated with arrows 122, fluidly coupling coolant outlet 116 with the external environment.

Coolant inlet 114 can be a first coolant inlet 114 disposed on a first end portion 124 of rotor body 110, e.g. the left hand side of rotor body 110 as oriented in FIG. 3. Rotor body 110 can optionally include a second coolant inlet 115 disposed on an opposed second end portion 128 of rotor body 110, e.g. the right hand side of rotor body 110 as oriented in FIG. 3. Providing coolant through coolant inlets located on opposing ends of the rotor body allows for even flow of coolant through rotor body 110 and permits balancing coolant flow.

Rotor body 110 is configured to rotate about its longitudinal axis by first and second shaft ends 132 and 133. First shaft end 132 supports first end portion 124 of rotor body 110 and is supported by first bearing 130. Second shaft end 133 supports second end portion 128 of rotor body 110 and is supported by second bearing 131. Shaft ends 132 and 133 respectively define axially extending channel coolant inlets fluidly coupling the interior of rotor body 110 (of generator 12) to coolant supply 24 (shown in FIG. 1). First and second coolant inlets 114 and 118 also respectively traverse first and second bearings 130 and 131 and are configured to provide cooling to the bearings. This allows for convectively removing heat generated by bearing friction using coolant supplied to rotor body 110.

Coolant entering rotor body 110 through coolant inlet 114 traverses the interior cooling segment of the rotor cooling path and removes heat from rotor body 110 by convection. The heat can originate from resistive heating of windings 60 (copper losses) or from eddy losses (iron losses) originating from changing magnetic flux within rotor body 110. First and second coolant inlets 114 and 118 can also include a nozzle configured to spray coolant over interior surfaces of rotor body 110. This reduces the volume of coolant necessary for cooling rotor body 110.

Coolant exiting rotor body 110 through coolant outlet 116 traverses the exterior cooling path segment, e.g. gap 54, of the rotor cooling path and removes heat by advection. This heat can originate by windage, e.g. arising out of frictional drag of viscous fluid contacting moving exterior surfaces 112 or rotor body 110. The coolant exiting rotor body 110 can also convect heat away from exterior surface 112 and interior surface 56 of stator 50. As will be appreciated by those skilled in the art, actively cooling rotor body 110 allows for increasing and/or decreasing coolant flow rate in cooperation with generator operation to control temperature within gap 54, thereby controlling the gap size by managing component expansion and contraction due to heating. As will also be appreciated, using a coolant like hydrogen reduces windage losses owing to the lower viscosity of the fluid. It also reduces the likelihood of damage to rotor body windings 60 from corona discharges.

Figure 4A:
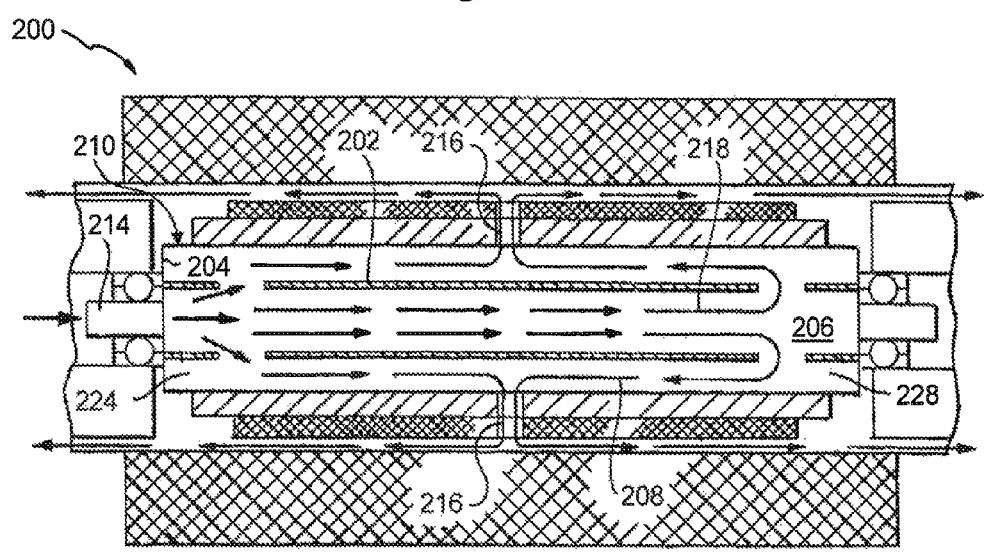
FIG. 4A is a schematic cross-sectional view an embodiment of a rotor body, showing a rotor body baffle within the rotor body.

Referring now to FIG. 4A, a rotor 200 is shown including a rotor body 210. Rotor body 210 defines an interior rotor body cavity 206 and includes a baffle 202. Baffle 202 is coupled to rotor body interior surface 204 and divides rotor body cavity 206 into a first coolant channel 208 and a second coolant channel 218. First and second coolant channels 208 and 218 fluidly couple coolant inlet 214 with coolant outlet 216. Baffle 202 improves cooling by (a) increasing the cooling surface area, (b) increasing the residence time of coolant within rotor body 210, and (c) increasing the mixing of the coolant within rotor body 210. It also provides for cooling rotor body 210 with a single coolant inlet positioned on and end of rotor body 210. This simplifies construction of rotor body 210.

In the illustrated embodiment, coolant enters rotor body 210 through coolant inlet 214, longitudinally traverses rotor body 210 from first end portion 224 to second end portion 228, reverses direction in second end portion 228, and traverses a portion of rotor body 210 a second time, thereafter exiting rotor body 210 through coolant outlet 216. As will be appreciated by those skilled in the art, baffle 202 can extend axially through the rotor body interior. Alternatively, baffle 202 can extend circumferentially, contacting rotor body interior surface 204 and extending radially inwards. Baffle 202 can also define a spiral helix pattern as may be suitable for the heat removal requirements of a particular generator. Other baffle patterns can be used to increase the cooling surface area and increase the residence time of coolant with rotor body 210.

Figure 4B:
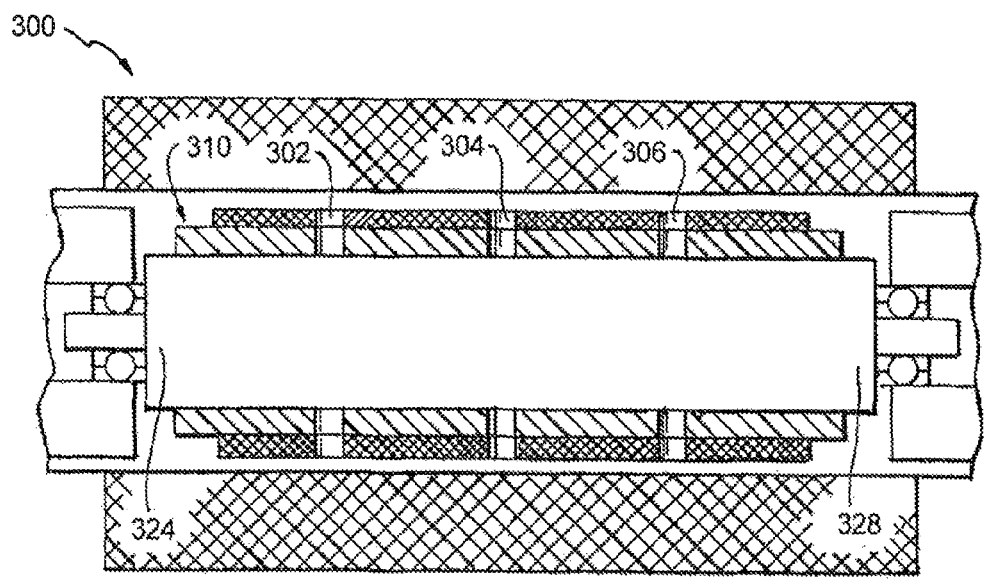
FIG. 4B is a schematic cross-sectional view another embodiment of a rotor body, showing axially leaning coolant outlets oriented toward a first rotor body end portion.

Referring now to FIG. 4B, a rotor 300 is shown. Rotor 300 includes a rotor body 310. Rotor body 310 is similar to rotor body 110 and additionally includes a first coolant outlet 302, a second coolant outlet 304, and a third coolant outlet 306. Coolant outlets 302, 304, and 306 are axially arranged at different longitudinal distances from respective end portions 324 and 328 of rotor body 310. First coolant outlet 302 is axially closer to first end portion 324, third coolant outlet 306 is axially closer to second end portion 328. This provides for relatively uniform coolant distribution over exterior surface 312 of the rotor body for providing additional coolant flow to hot spots that may exist on the rotor body surface due to anomalies in rotor construction or during operational thermal transients. As will be appreciated, different numbers and pitches of coolant outlets can be selected as is suitable for a given application.

Coolant outlets 302, 304, and 306 can be defined by overlapping radial slots in adjoining rotor laminations. As will be appreciated by those skilled in the arts, the radial slots width, radial width and length can be arranged to define radial, tangential, or circumferentially oriented coolant outlets. Coolant outlets 302, 304, and 306 can also can also be formed, or optimized for example, to provide appropriate flow resistance to coolant flowing though the coolant outlet. This construction minimizes the electromagnetic penalty associated with discontinuities in the rotor body as the magnetic flux lines are only intermittently interrupted.

Figure 4C:
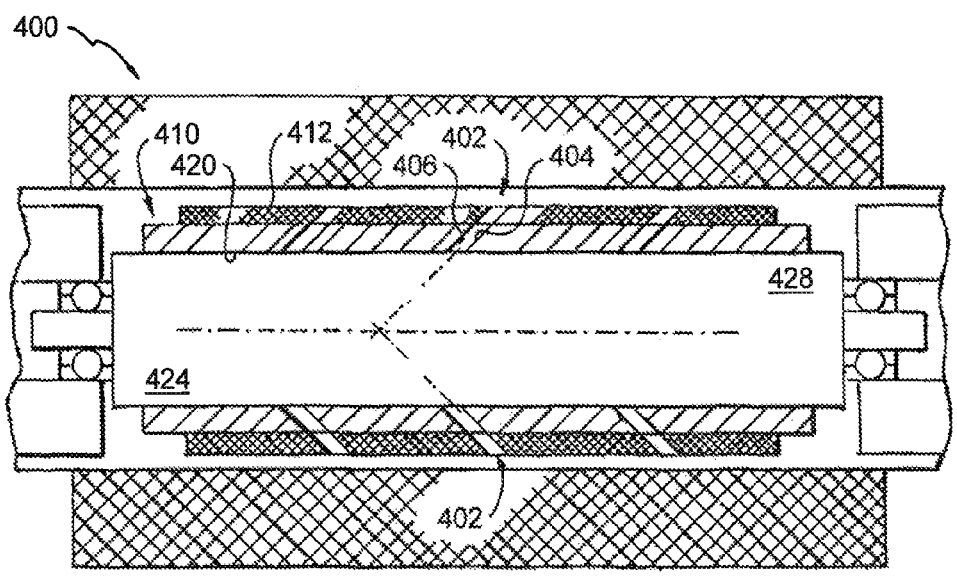
FIG. 4C is a schematic cross-sectional view yet another embodiment of a rotor body, showing axially leaning coolant outlets oriented toward a second rotor body end portion.

Referring now to FIG. 4C, a rotor 400 is shown. Rotor 400 includes a rotor body 410. Rotor body 410 is similar to rotor body 110 and additionally includes a coolant outlet 402 defined by sidewalls 404 and 406. Sidewalls 404 and 406 extend through a thickness of rotor body 410 between interior and exterior surfaces 420 and 412. Sidewalls 404 and 406 define a coolant outlet axis that is oblique with respect to a longitudinal axis of rotor body 410 and oriented toward a second end 428 or rotor body 410. As will be appreciated by those skilled in the arts, coolant outlet 402 can be axially leaning toward first end portion 424 of the rotor body. Hybrid combinations are also possible. Such coolant outlet orientations allow for balancing coolant flow within the rotor cavity.

Figure 5A:
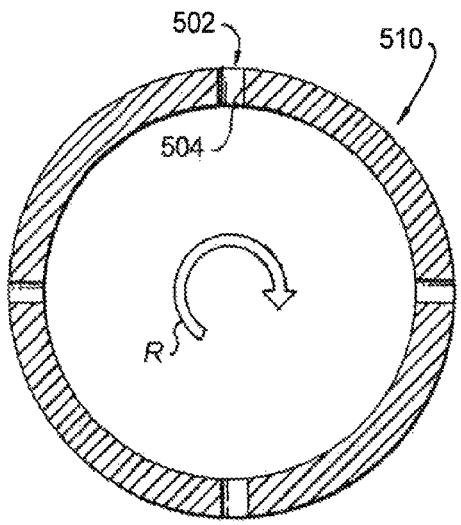
FIG. 5A is a schematic cross-sectional axial view of the rotor body of FIG. 3, showing a plurality of coolant outlets circumferentially disposed about a circumference of the rotor body.

Referring now to FIG. 5A, a rotor body 510 is shown. Rotor body 510 is similar to rotor body 110, and additionally includes a coolant outlet 502 defined by a sidewall 504 extending through rotor body 510. Rotor body 510 can include one or more coolant outlets 502 disposed circumferentially about a rotor body 510. Distributing coolant outlets about the circumference of the rotor body provides for uniform cooling of the entire radial inner surface. It also prevents developing radial hot spots by uniformly distributing coolant through the interior of the rotor body.

Figure 5B:
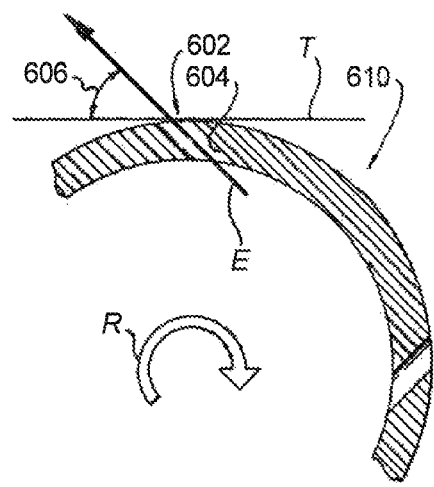
FIG. 5B is a schematic cross-sectional axial view of a rotor body, showing a tangentially oriented coolant outlet facing in a direction of rotor body rotation.

Referring now to FIG. 5B, a portion of a rotor body 610 is shown. Rotor body 610 is similar to rotor body 110 and additionally includes a coolant outlet 602 defined by a sidewall 604. Sidewall 604 defines a coolant flow path E. Coolant flow path E intersects a line T tangent with rotor body 610 to form an acute angle 606. Angle 606 is opposite a direction of rotation of rotor body 610. Orienting coolant outlet 602 in a direction opposite the direction of rotation (R) decreases the rate of coolant flow through the coolant outlet. This provides reduced rotor body cooling near the outlet.

Figure 5C:
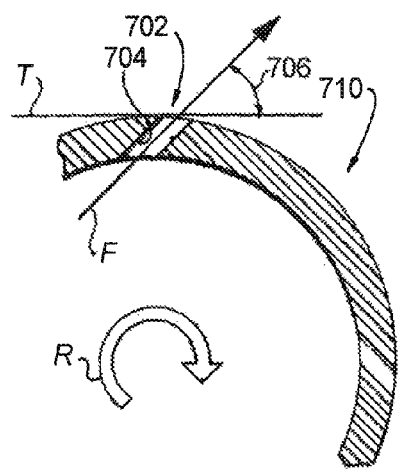
FIG. 5C is a schematic cross-sectional axial views of an embodiment of a rotor body, showing a tangentially oriented coolant outlet facing in a direction opposite rotor body rotation.

Referring now to FIG. 5C, a portion of a rotor body 710 is shown. Rotor body 710 is similar to rotor body 110 and additionally includes a coolant outlet 702 defined by a sidewall 704. Sidewall 704 defines a coolant flow path F. Coolant flow path F intersects a line T tangent with rotor body 710 to form an acute angle 706. Angle 706 is in the direction of rotation (R) of rotor body 610. Orienting coolant outlet 602 in the direction of rotation increases rate of coolant flow through the coolant outlet. This provides increased rotor body cooling near the outlet.

Conventional generators are subject to heating from bearing friction, eddy losses due magnetic field change, and resistive heating from current flow within conductor windings. High-speed generators are subject to frictional heating of fluid within the gap between the rotor and stator, e.g. windage losses. Embodiments of the rotor described herein convect heat generated through eddy losses and resistive heating by actively cooling the rotor body by forcing coolant through the rotor body. Embodiments of the rotor described herein also advect away heat generated by windage by forcing coolant through the gap between the rotor and stator. Embodiments of the rotor described herein further reduce the amount of heat generated by windage by purging the gap between the rotor and stator of air and replacing it with hydrogen. Since hydrogen conducts heat more effectively than air, heat is more effectively conducted from both the rotor and stator and into the hydrogen. Moreover, since windage losses are proportional to the density of the medium occupying the air gap raised to the 2.5 power and to approximately the square root of the medium's viscosity, the amount of heat generated by windage is reduced. This allows for relatively small amounts of hydrogen to cool the generator than were air, oxygen or nitrogen used for active cooling. As will be appreciated by those skilled in the art, actively cooling the rotor with a coolant like hydrogen provides a generator with greater rotor speed, efficiency, and/or power density than conventionally generator of similar size, geometry, and weight. As will also be appreciated, other gases readily available coolants can be such as xenon, available in some types of nuclear powered turbo-generator, or helium, available in some types of helium power auxiliary power units can be employed with similar effect.

The methods and systems of the present disclosure, as described above and shown in the drawings, provide methods and systems to generate electrical power. Embodiments of the methods and systems described herein can provide power using compact high-speed generators with active open loop cooling systems. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A rotor for a high-speed generator, comprising:
    a rotor body defining:
        an interior surface and opposed exterior surface;
        a coolant inlet and outlet extending between the interior and exterior surfaces; and
    a rotor cooling path including (i) an interior cooling path segment bounded by the rotor body interior surface and fluidly coupling the coolant inlet to the coolant outlet, and (ii) an exterior cooling path segment bounded by the rotor body exterior surface and fluidly coupling the coolant outlet to an external environment for open loop cooling the rotor body; and
    a cryogenic fuel supply in fluid communication with the coolant inlet.

2. A rotor as recited in claim 1, wherein the coolant inlet is configured to fluidly couple the rotor body to a cryogenic fuel supply.

3. A rotor as recited in claim 1, wherein the coolant inlet is configured to fluidly couple the rotor body to a hydrogen, oxygen, xenon, or helium supply.

4. A rotor a recited in claim 1, further comprising a baffle coupled to the rotor body inner surface and dividing an interior cavity of the rotor body into a plurality of coolant channels extending between the coolant inlet and the coolant outlet.

5. A rotor as recited in claim 1, wherein the rotor body defines a plurality of coolant outlets disposed along an axial length of the rotor body.

6. A rotor recited in claim 1, wherein the rotor body defines a plurality of coolant outlets disposed about a circumference of the rotor body.

7. A rotor as recited in claim 1, wherein the coolant outlet is bounded by a sidewall extending between the interior and exterior surfaces of the rotor body through a thickness of the rotor body.

8. A rotor as recited in claim 4, wherein the sidewall intersects a longitudinal axis of the rotor body obliquely such that the coolant outlet is oriented toward a first end portion of the rotor body.

9. A rotor as recited in claim 4, wherein the sidewall intersects a longitudinal axis of the rotor body obliquely such that the coolant outlet is oriented toward a second end portion of the rotor body.

10. A rotor as recited in claim 4, wherein the sidewall defines a coolant outlet axis oriented radially outward and towards a direction of rotation of the rotor body.

11. A rotor as recited in claim 4, wherein the sidewall defines a coolant outlet axis oriented radially outward and opposite a direction of rotation of the rotor body.

12. A turbo-alternator, comprising:
    a rotor as recited in claim 1;
    a stator with an inner surface opposing the rotor body exterior surface and bounding the exterior cooling path segment of the rotor cooling path; and
    a cooling path fluidly coupled to the rotor cooling path including a supply orifice and an exhaust orifice, wherein the supply orifice is configured to fluidly couple with a pressurized coolant source for actively cooling the rotor body, wherein the exhaust orifice is fluidly coupled to an external environment for open loop cooling.

13. A turbo-alternator as recited in claim 12, wherein the coolant inlet is configured to cool bearings supporting the rotor body using coolant flow traversing the coolant inlet.

14. A turbo-alternator as recited in claim 13, wherein the cooling path includes a speed control valve fluidly coupled between the supply orifice and the coolant inlet of the rotor body.

15. A turbo-alternator as recited in claim 14, wherein the speed control valve is fluidly coupled to the rotor body through a first coolant inlet and a second coolant inlet.

16. A turbo-alternator as recited in claim 15, wherein the first and second coolant inlets are arranged on opposite ends of the rotor body.

17. A method of cooling a generator, comprising:
   receiving hydrogen coolant from a vehicle fuel supply at an inlet of a rotor body;
   flowing the hydrogen coolant through the rotor body along a coolant path including (i) an interior cooling path segment bounded by the rotor body interior surface and fluidly coupling the coolant inlet to the coolant outlet, and (ii) an exterior cooling path segment bounded by the rotor body exterior surface; and
   exhausting the hydrogen coolant into the environment external to the vehicle by flowing the hydrogen coolant through a coolant outlet fluidly coupling the exterior cooling path segment to the external environment.

18. A rotor as recited in claim 1, further comprising a pump fluidly coupling the cryogenic fuel supply to the coolant inlet.

19. A rotor as recited in claim 1, wherein the cryogenic fuel supply is fluidly coupled to the coolant inlet in blow down arrangement.

* * * * *